United States Patent [19]

Ehrenberg

[11] Patent Number: 5,002,227

[45] Date of Patent: Mar. 26, 1991

[54] PLANT PROTECTION DISCHARGE APPARATUS

[75] Inventor: Henry Ehrenberg, Knittlingen, Fed. Rep. of Germany

[73] Assignee: Neumo Grundbesitz-GmbH, Fed. Rep. of Germany

[21] Appl. No.: 306,844

[22] Filed: Feb. 3, 1989

[30] Foreign Application Priority Data

Feb. 3, 1988 [DE] Fed. Rep. of Germany ....... 3803145

[51] Int. Cl.$^5$ .............................................. A01C 15/00
[52] U.S. Cl. .................................... 239/172; 239/290; 47/1.7
[58] Field of Search ............... 239/121, 291, 172, 288, 239/120, 290; 47/1.7

[56] References Cited

U.S. PATENT DOCUMENTS

| | | | |
|---|---|---|---|
| 2,293,517 | 8/1942 | Messinger et al. | 47/1.7 X |
| 2,410,532 | 11/1946 | Tessier | 239/291 |
| 2,977,715 | 4/1961 | Lindsay | 239/172 X |
| 3,584,787 | 6/1971 | Thomason | 239/121 |
| 4,865,628 | 9/1989 | Iwanczyk | 47/1.7 |

FOREIGN PATENT DOCUMENTS

| | | |
|---|---|---|
| 8127328 | 2/1982 | Fed. Rep. of Germany . |
| 3738518 | 11/1987 | Fed. Rep. of Germany . |
| 2501461 | 9/1982 | France . |
| 2598941 | 11/1987 | France . |
| 2606672 | 5/1988 | France . |
| 2607029 | 5/1988 | France . |
| 2157935 | 11/1985 | United Kingdom . |

OTHER PUBLICATIONS

Transactions of the American Society of Agricultural Engineers, vol. 26, No. 3, May 1983, pp. 732–736: "Saturation Spraying of Blueberries with Partial Spray Recovery".

Primary Examiner—Andres Kashnikow
Assistant Examiner—Kevin P. Woldan
Attorney, Agent, or Firm—Eckert Seamans Cherin & Mellott

[57] ABSTRACT

A discharge apparatus (1f) for treatment media has cabin-like discharge units (3f) bounding in each case a passage (4f), which are in each case provided with at least one discharge device (10f) for the treatment medium, at least one air-carrying back suction device (17f) for the treatment medium not absorbed by the plants (2f) and a compressed air device (13f) for producing both a turbulence air flow (65) and air curtains. The back suction device (17f) can operate directly or indirectly in circuit with the compressed air device (13f). Thereby benefits are achieved for operating and processing with low consumption of treatment medium despite high velocity of operation.

35 Claims, 8 Drawing Sheets

PLANT PROTECTION DISCHARGE APPARATUS

BACKGROUND OF THE INVENTION

1. Field of the Invention

The invention relates to a plant protection discharge apparatus for plant crops, such as agricultural row crops, having e.g. at least one discharge unit to be moved over a row of plants. This discharge unit forms a treatment zone or a passage for the plants and can have discharge means for treatment media.

2. Prior Art

Such plant protection discharge apparatus are more particularly used for the treatment of standard plants, such as grapevines, the media to be discharged serving to protect the plants, fertilize them or provide similar treatments. It is generally wished to apply the treatment agent in such a way that the plants are intensely covered or wetted also when in leaf in a large or complete-area manner, both on the plant stem and branches and on both sides of the leaves.

This is very difficult when at the same time ensuring an adequate working speed and is not satisfied by known discharge apparatus. In particular the use of large treatment medium quantities leads to a supersaturation of the soil and therefore to poorer harvests or to the soil being impaired by the treatment agents.

In the case of the hitherto known blower spray technology there has been a very considerable drifting of the spray mist into the environment and in particular into the area surrounding the particular crops. Wind and thermal influences carry the discharged medium into the atmosphere in an uncontrolled manner and in part the water is evaporated.

German utility model 81 27 328 discloses a plant protection sprayer, which has for each treatment zone a separate cross-flow blower for a carrier gas flow with associated nozzle unit and a deflection wall with a collecting device for returning excess treatment medium optionally facing the same in spaced manner on the other side of the treatment zone. This sprayer suffers from numerous disadvantages, because in particular the return of the excess treatment medium is problematical, the construction of the blower arrangement complicated and the security against freely exiting spray mist which is therefore lost without wetting the plants is inadequate.

SUMMARY OF THE INVENTION

An object of the invention is to provide a discharge apparatus for plant treatment media which, in the case of high operating speeds, permits an intense application of the treatment medium and therefore ensures that the said treatment medium is to the greatest possible extent kept away from the soil.

According to the invention this object is achieved by the provision of means, ensuring the removal or return or sucking back in an air flow of the discharged treatment medium particles floating in the air or air flow and which have not been deposited on the particular plant and either at least partly directly supply the same to the discharge means again or e.g. after separation from the delivery air intermediately store the same, so that the thus intermediately stored, sucked back treatment medium can again be supplied to a suitable use. The sucking back device appropriately has a suction air conveyor, namely e.g. a suction blower, which simultaneously can be used as a compressed air conveyor, e.g. for returning the sucked back treatment medium to the discharge means or for another function of the discharge apparatus.

Instead of the described construction, but in particular in addition thereto, a very advantageous solution of the inventive problem is also obtained if means are provided for the substantially complete enveloping of the plant to be treated with an air turbulence zone, which forms different air flows located in all directions in space and which to a greater or lesser extent or in fully saturated form carry the treatment medium particles or droplets to all zones of the plant, or, if they do not reach the latter can instead reach the return suction device. The air used for producing the air turbulence zone can be the removal or compressed air of the previously described air conveyor, so that a circuit is obtained between the return suction and discharge or air turbulence flow, in which the sucked back particles of the treatment medium can at least partly be directly supplied again to the plants without any intermediate separation in the surrounding air flow.

If it is not wished for the treatment medium to act on the air conveyor or the suction and pressure blower, upstream of the air conveyor in the flow path of the return suction device can be provided a separator for the treatment medium, e.g. a cyclone separator, from which the treatment medium is then supplied to an intermediate storage means, e.g. the main storage means for the treatment medium. This makes it possible for only part of the sucked back treatment medium to be directly passed through the air conveyor, while the other part is separated.

In place of the described constructions, but in particular in addition thereto, the inventive problem can advantageously also be solved in that at least one boundary of the treatment zone or passage is at least partly formed by an air curtain, which is e.g. obtained in that in the surface or plane of said boundary a flat air flow is produced from at least one boundary edge and in the case of providing a turbulence zone is appropriately stronger than its air flow, but can pass continuously into said turbulence zone or can be linked therewith. Thus, in the center of the passage there is a very turbulent air flow, which is directed increasingly more uniformly towards the air curtain and is therefore protected against a passage through said air curtain. Such an air curtain is particularly suitable for the front and/or rear open end of the passage, into which the plants pass or from which the plants leave the passage, but at least one lateral or lower and/or upper boundary of the passage can also be at least partly formed by such an air curtain. It is particularly advantageous if the air curtain is formed by air nozzles positioned opposite to one another and directed counter to one another approximately in parallel or aligned manner and which can be juxtaposed in one or more rows.

The suction openings of the suction back device appropriately take up the larger surface part of one and/or the other lateral boundary or instead of or in addition thereto the upper boundary of the passage, the surface portion of the suction opening being between 50 and 90% and preferably at least or more than 70% of the associated boundary.

In order to ensure minimum treatment medium losses, means are provided, which prevent a rebounding or reflection-like splashing back of the treatment medium from the passage boundaries. These means forming a rebound damping means, can be formed by gratings, Venetian blindlike slats or the like, which preferably cover or bound the particular suction opening of the suction back device.

For forming the air turbulence zone on the one hand and the air curtain on the other, it is possible to provide separate nozzles or use the same air nozzles. It is appropriate if one and/or the other of said air nozzles are provided at the end of the passage, more particularly in a superimposed or facing manner and they can be located directly adjacent to at least one suction opening. If the direction of these air nozzles can be modified independently of one another with respect to the median longitudinal plane of the passage with regards to the angular position of their nozzle axes, then certain air nozzles, e.g. can be directed substantially against the center of the passage or the turbulence zone, while other air nozzles can be oriented approximately at right angles to the median longitudinal plane and consequently form the associated air curtain. However, instead of this or in addition thereto, the air nozzles can also be directionally adjustable in elevation, so that advantageously a bottom to top sloping flow in the passage is assisted.

The discharge means of the inventive apparatus can be constructed for the discharge of dust-like or pulverulent treatment media or instead of or in addition thereto for the discharge of liquid treatment media. The separator for the separation can correspondingly be constructed for dry and/or liquid treatment media. In the case of liquid treatment media, the discharge means appropriately have discharge nozzles, which are located roughly in the center between the ends of the passage or between the air curtain and the discharge nozzles can be superimposed and/or facing one another on either side of the passage. If the discharge nozzles on one side are directed against the facing suction opening of the suction back device, or if the discharge nozzles are directly upstream of the suction opening provided on the associated side, then the suction back can be further improved. The discharge nozzles are appropriately directionally adjustable in the height or longitudinal direction of the passage and the jets of the discharge nozzles and the turbulence air nozzles appropriately meet one another in the center of the passage or turbulence zone.

The treatment medium losses penetrating the soil can also be significantly reduced in that the suction back device used e.g. for mist return suction has substantially exclusively upwardly directed flow paths from its suction opening within the associated discharge unit, which can e.g. be achieved in that a suction connection to be connected to the suction side of the air conveyor is located on the top of the passage.

As a result of the inventive construction it is possible in a single e.g. closed flow system to spray treatment media and suck back the excess media mist, or instead of or in addition thereto spray treatment media, keep same in turbulence form in the vicinity of the plants to be treated and also suck back again the excess media mist. It is also conceivable to spray in or supply the treatment medium directly to the delivery air flow in the vicinity of the air nozzle, in the vicinity of the pressure duct leading to it and/or in the vicinity of the suction duct of the air conveyor, which can e.g. also take place in the vicinity of a Venturi tube, into which the treatment medium is appropriately supplied under pressure. The air conveyor or nozzle can be constituted by an axial and/or radial blower, as a function of whether higher pressures and flow rates or higher air delivery quantities are desired. However, it is also possible to use the delivery nozzles and spray pumps of sprayers integrated with a chassis frequently encountered in agriculture and optionally only the blower rotor has to be replaced for increasing the efficiency.

The use of such air conveyors also has the advantage that the conveyed or delivered air is heated and by thermal action also assists the upwardly directed flow. In place of the air curtain and/or in addition thereto, it is possible to provide a flexible curtain in the form of automatically swinging back, pairwise facing door leaves made from flexible plastics material. If working takes place with a positive air pressure within the passage, said pressure can be used for keeping said curtain in a desired open position against the restoring force acting thereon.

A particularly advantageous further development of the inventive object comprises the provision of means in order to so deflect a treatment flow, namely e.g. an air flow and/or a particle flow of treatment medium in the vicinity of the treatment zone in such a way that at least parts of said treatment flow flow two or more times in the same direction or in different directions through the treatment zone and therefore the plants, so that the latter are exposed thereto several times in succession. If the treatment flow contains treatment medium, then at least part of the particles not deposited during the preceding passage through the plant are directed against the latter again without any intermediate separation and are then optionally deposited thereon, e.g. from the opposite side or at an angle thereto. Means can be provided which before, during or after the deflection recharge with treatment medium the treatment flow with regards to its flow energy and its saturation, so that e.g. again carrier air and/or particulate, atomized treatment medium is supplied. If the treatment flow paths connected to one another over a deflection area of e.g. max. 90° to slightly more than 180° are not superimposed, they are appropriately roughly horizontal, namely e.g. in succession in the passage direction and spaced with respect to one another in such a way that between them there is a transverse sparing, which is roughly the same as the associated flow cross-section extension of at least one of the treatment flows. Thus, a rotating turbulence flow roll can be produced in the space between the flow paths and located roughly in the centre of the treatment zone and which e.g. in the case of standard plants rotates about their upright stem axis or an eddy axis, which is located roughly in the associated axial plane of the row of plants. The charging of the treatment flow in the vicinity of the flow path appropriately takes place with a carrier air flow, which simultaneously also forms an air curtain protecting against the exiting of treatment medium particles on the outside of the associated flow path or on the associated, e.g. front end of the passage remote from the adjacent flow path and this can simultaneously contribute to the further deflection of the treatment flow on said flow path in the rotation direction of the deflection.

The invention also proposes means with which the treatment flow is discharged in the vicinity of the same side of the treatment zone, particularly in the vicinity of the boundary associated with the blower and is sucked back again and at least one diverting device with a diverting inlet, a deflection outlet spaced therefrom and optionally members of a separating or flow deflection device located in the flow cross-section are associated with the free flow paths formed by successive portions of the treatment flow traversing the treatment zone in the flow direction. Corresponding members can also be provided in the vicinity of the blower-side return suction and e.g. these members formed by sets of slats can be used for flow deflection and for ensuring the separation of excessively large treatment medium particles, which would therefore be difficult for the carrier air flow to move. They are then appropriately collected in downwardly flowing manner and either directly returned to the discharge nozzles and/or to a storage container. For the deflection of the treatment flow it is appropriate to provide a channel, trough or shell-like diverting wall, whose upright shell wall faces the blower outlet and blower inlet. In order that the flow cross-section and the flow orientation of the particular treatment flow portion can be adjusted to the particular plant form and the particular leaf state thereof, in the vicinity of at least one opening used for the inflow or outflow of the treatment flow can be provided an adjustable flow directing body, said opening appropriately being provided with a guide vane on its front and/or rear upright boundary with respect to the movement direction and which can be pivoted about an upright axis. Thus, the opening can be widened in funnel-like manner in the outflow or inflow direction, can be bounded in parallel or narrowed in funnel-like manner, while different orientations are possible by pivoting both vanes in the same direction. Such guide vanes are particularly advantageous at the blower outlet and at the deflecting outlet or on the outlet adjacent thereto for the supply of the accelerating air flow and/or additional treatment medium and the associated vane, e.g. of the blower outlet can simultaneously protect the adjacent opening forming the blower inlet with respect to the blower outlet, so that said two openings can be substantially directly adjacent or behind one another. Appropriately the discharge nozzles associated with the particular outlet are also adjustable about an axis corresponding to the pivot axes of the guide vanes with respect to their nozzle alignment and advantageously are coupled with at least one of the associated guide vanes in such a way that they can be jointly adjusted automatically by the latter and consequently always have the same alignment at least with respect to said guide vane.

As a function of which blower type is to be used for the inventive discharge apparatus, it is possible to use for the particular discharge unit one, two or more blowers, e.g. axial, radial, transverse-flow or tangential blowers, etc. However, it is particularly advantageous if the discharge apparatus only has a single blower for two or more adjacent treatment zones, said blower advantageously being constructed as an axial blower. This blower appropriately constructed as a radial blower has an axial blower suction opening and a radially outwardly directed blower pressure opening axially directly adjacent thereto or to the blower rotor. The blower or blower rotor can be constructed in such a way that it receives unseparated treatment medium and with the carrier air flow produced by it immediately discharges the same in finely divided particulate form. Below the blower or blower rotor can be provided a collecting trough for any separated treatment medium, which is then directly returned by said trough to the discharge nozzles or to the storage tank.

In order to be able to use a relatively simple blower or to re-equip in simple manner an existing blower or discharge means to the inventive construction, appropriately a guide casing is provided for the reception of the blower and this then bounds the blower outlet differently oriented with respect to the blower pressure opening or the return suction inlet differently oriented with respect to the blower suction opening and which is appropriately also oriented approximately radially with respect to the blower axis, so that the radially sucked back part of the treatment flow is deflected axially into the blower in the guide casing.

The inventive discharge apparatus is advantageously dismantlable and/or adjustable in such a way that it can perform different discharge processes or it can be fitted in simple manner to existing sprayers and in the case of non-use can be transported and/or stored in a spacesaving manner. It is particularly appropriate if the boundary of the treatment zone facing the blower and e.g. formed by the diverting device can be transferred by pivoting or the like into a position axially substantially linked with the blower and to the circumference of the blower or guide casing, in which no boundary then faces the blower outlet or the associated discharge nozzles, so that the treatment flow can then be discharged into the open in an unimpeded, unlimited, conventional manner.

As stated, the or a primary carrier air flow can also emanate from a treatment zone boundary, e.g. the facing boundary which is at an angle to or spaced from the blower unit, which can then form a diverting device for the treatment flow. Thus, a treatment flow can be continuously passed in circuit through two, e.g. spaced, facing diverting devices and in the vicinity of each diverting device can be so constantly recharged with treatment medium with respect to its flow energy and/or its saturation, that its flow energy or saturation remains substantially constant in the vicinity of the flow paths freely crossing the treatment zone. In order to only require a single blower for this, the treatment zone boundary facing the blower unit is connected by means of articulated, jointed or flexible duct arms, outriggers or jibs to the blower unit or blower pressure opening and/or to the blower suction opening. In the case of connection to the suction opening, the treatment flow directed against the opposite boundary can be even better oriented or delivered with respect to the diverting inlet. The duct arm or arms are appropriately located on the top of the treatment zone and can be so connected by means of suitable sealing members, e.g. elastic, sleeve-like roll membranes and movably to the facing boundary, that they are merely detachably inserted from top to bottom. An upper treatment zone cover constructed in the manner of a wall shield can be formed in simple manner by a flexible foil or by a hung or stretched protective tarpaulin, which is appropriately located on the bottom of the duct arm or arms, is at least partly fixed thereto and therefore in no way impairs its articulation movements.

To adapt the width of the treatment zone or passage to the plants to be treated, the treatment zone, advantageously with articulated arms, which also carry or support or can be formed by the duct arms, in at least one area of their height, particularly in the upper and lower area, are differently or separately width-adjustable. For example, the treatment zone boundary facing the blower unit can in its upper area be arranged pivotably on the arm about an axis approximately parallel to the running direction, so that it can be adjusted in sloping manner to the outside or inside. This also makes it possible to pivot this boundary into an approximately horizontal position above the plants, which makes it possible to move the discharge apparatus during reversing in the manner of freely projecting arms over the plant with respect to its running direction and without impediment.

It is admittedly conceivable to arrange the discharge apparatus on a trailer to be coupled in articulated manner to a motor or towing vehicle, but a particularly advantageous construction with regards to the running precision is obtained if the discharge apparatus with a supporting frame or the like and at least with regards to the lateral guidance, is arranged substantially rigidly on the chassis of a motor vehicle, e.g. a tractor or towing vehicle. The supporting frame projects in freely floating manner from the chassis or can optionally additionally be provided with at least one support wheel running on the ground. Appropriately the discharge apparatus is made raisable and lowerable in that it is mounted with coupling members on hydraulically raisable and lowerable, so-called three-point linkages of the motor vehicle. This leads to a saddled arrangement of the discharge apparatus on the towing machine. Another arrangement and construction or further development of the discharge apparatus can be obtained on the basis of German patent application P 37 38 518.6, to which reference should be made for further details, features and effects.

These and further features of preferred developments of the invention can be gathered from the claims, description and drawings, in which individual features, in each case singly or in the form of subcombinations can be realized in an embodiment of the invention and in other fields and constitute advantageous, protectable constructions, for which protection is here claimed.

BRIEF DESCRIPTION OF THE DRAWINGS

An embodiment of the invention is described in greater detail hereinafter relative to the drawings, wherein are shown.

DETAILED DESCRIPTION OF THE PREFERRED EMBODIMENTS

Figure 1:
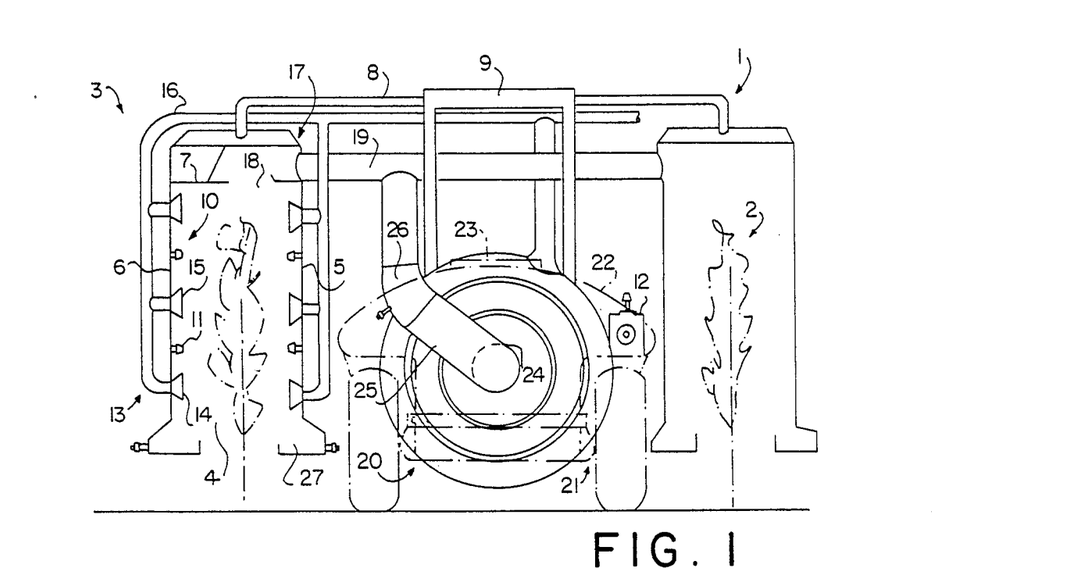
FIG. 1: an inventive plant protection discharge apparatus in simplified representation and viewed in the direction of travel.
Figure 2:
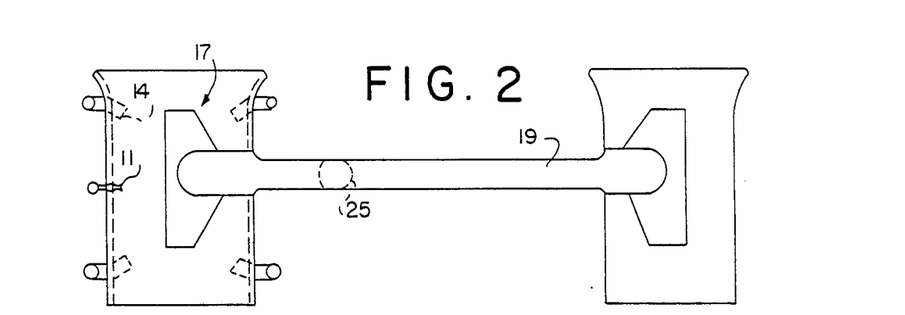
FIG. 2: part of the discharge apparatus of FIG. 1 in plan view.

The discharge apparatus 1 shown in FIGS. 1 and 2 is e.g. used for the treatment of row crops, whose plants are set in parallel, spaced rows, so that it is possible to travel between the rows. For both these adjacent rows the discharge apparatus 1 in each case has a discharge unit 3, the two discharge units 3 being substantially indentically constructed and arranged in mirror symmetrical manner to one another.

With respect to the travelling or running direction parallel to the rows and indicated by arrow 34 (see FIG. 5), each discharge unit forms a front and rear open, cabin-like passage or treatment zone 4, which is also open at the bottom, i.e. is bounded in substantially U-shaped manner by lateral boundaries or walls 5,6 and an upper wall 7. The resulting cabin body is articulated at the end of a jib or arm 8 of a supporting frame 9 substantially only engaging at its top and which is located between the plant rows and is to be fixed to a suitable transporting means. Arm 8 makes it possible to separately transversely adjust each discharge unit 3 and therefore set it to the row spacing.

Discharge unit 3 has a discharge device 10 for dusting agents or treatment liquor, which are essentially formed by discharge nozzles 11 on the insides of the side walls 5,6. In each case several discharge nozzles 11 are superimposed roughly in the center of the length of passage 4 or the cabin body and are directed against the facing lateral wall. Discharge nozzles 11 are connected by means of suitable, flexible pressure lines guided at the top over the discharge units 3 to the pressure side of a liquid pressure pump 12. The discharge device 10 of each discharge unit 3 can be stopped or blocked off independently of the other discharge units and each discharge nozzle 11 can be separately closed. The discharge nozzles 11 are approximately uniformly distributed over the entire height of passage 4.

With each discharge unit 3 is also associated a separately stoppable or blockable compressed air device 13, which is provided in the vicinity of each end of the passage 4 with substantially uniformly distributed, superimposed air nozzles 14,15 in the vicinity of each end of the passage 4 on the insides of both side walls 5,6 and which are e.g. constituted by vertically extending wide-mouth nozzles. These air nozzles are connected to compressed air feed lines 16 outside the passage or cabin body. These air nozzles 14,15 can be used for forming an air curtain at the associated end of passage 4 and for producing a turbulence air flow, into whose center located in the center of the length of passage 4 and extending over its entire height the discharge device 10 injects the treatment medium. However, separate air nozzles can be provided for the air curtain and the turbulence air flow and e.g. the air nozzles for the turbulence air flow are located in the vicinity of the discharge nozzles 11 or closer to the center of the length of passage 4 than the air nozzles for the air curtain. The underside of passage 4 can also be bounded by an air curtain and appropriately oppositely directed air nozzles are provided on either side of the open underside of the cabin body distributed over the length thereof and which are preferably inclined upwards under an angle of max. 45°.

Furthermore, with each discharge unit 3 is associated a separately stoppable or blockable suction back device 17, which is used for the sucking back of treatment medium mist floating in the passage 4 in the air flow of the compressed air device 13. In the represented embodiment the suction back device 17 is provided in the upper wall 7 of passage 4 with a suction opening 18 extending over most of its length or between the air curtains and which is connected to a blower 20 by a suction line 19 connected laterally to the inner side wall 5.

Blower 20 can e.g. be integrated with the discharge apparatus 1 or its supporting frame 9, so that together with the complete discharge apparatus 1 it can be taken from a chassis, e.g. a tractor or a trailer. In the represented embodiment the blower 20 is arranged on the chassis 21 of a single-axle trailer and namely on its rear end with horizontal rotor axis or parallel to the direction of travel and namely behind a container 22 carried by chassis 21 and which is used for carrying a large treatment medium supply with the discharge apparatus 1. Thus, blower 20, like the pressure pump 12 is driven by means of the power take-off shaft conventionally provided on tractors. However, it is also conceivable to drive the blower 20 hydraulically, in which case the driving fluid can be constituted by the treatment medium delivered by the pressure pump 12 or a hydraulic pump associated with said pressure pump 12 or integrated therewith. In the represented embodiment the blower 20 conventionally provided on sprayers has its casing open for axial suction and which is circumferentially provided with radial air outlets, is provided on the circumference with a circumferential or radial enclosure from which a branch line leads to the compressed air feed line 16. The suction side of blower 20 located on the back end face is also substantially closed and provided with suction connection 24, to which is connected a suction duct 25 leading to the suction line 19.

In order to separate the treatment medium fractions sucked off by the suction back device 17 in the air flow and optionally return the same to container 22, to the device 17 is connected a separator 26, preferably connected to suction duct 25, whereby said separator 26 can have a drain connected to container 22.

The insides of walls 5, 6, 7 are provided with slats, sieve nettings, gauzes, etc., independently of whether they have suction openings or not, so that the treatment media rebounding thereon do not tend to splash back in reflection-like manner and are instead initially absorbed or bound. Particularly if said absorption means are not located in the vicinity of a suction opening of the back suction device 17, in the case of saturation of the absorption means, the treatment medium will tend to flow away downwards. For collecting treatment medium flowing downwards along walls 5, 6, 7 in the lower region of passage 4 or on the undersides of the side walls 5, 6 are provided collecting troughs 27 with line connections extending over the entire cabin length and by means of which the collected treatment medium is sucked off by not shown return flow lines, e.g. with pressure pump 12 or an air jet pump (injector) and appropriately conveyed back into container 22 and/or directly into the feed line to the discharge nozzle 11.

Appropriately means are also provided to permit the separate blowing off of the associated plants 2 with each discharge unit 3, e.g. for dusting or removing excess treatment medium and in this case the air nozzles 14, 15 are set to a throttled blowing capacity. The particles removed from plants 2 by this blowing off can be simultaneously sucked off with the back suction device 17 and optionally returned in the described manner. In another advantageous further development of the invention, there are at least two nozzle systems of discharge nozzles 11, which can be constructed for the discharge of different treatment media. Thus, e.g. at different heights different treatment media can be discharged, namely e.g. in the fruit hanging zone of plants 2 a different spray can be discharged as compared with the leaf zone thereof.

Figure 3:
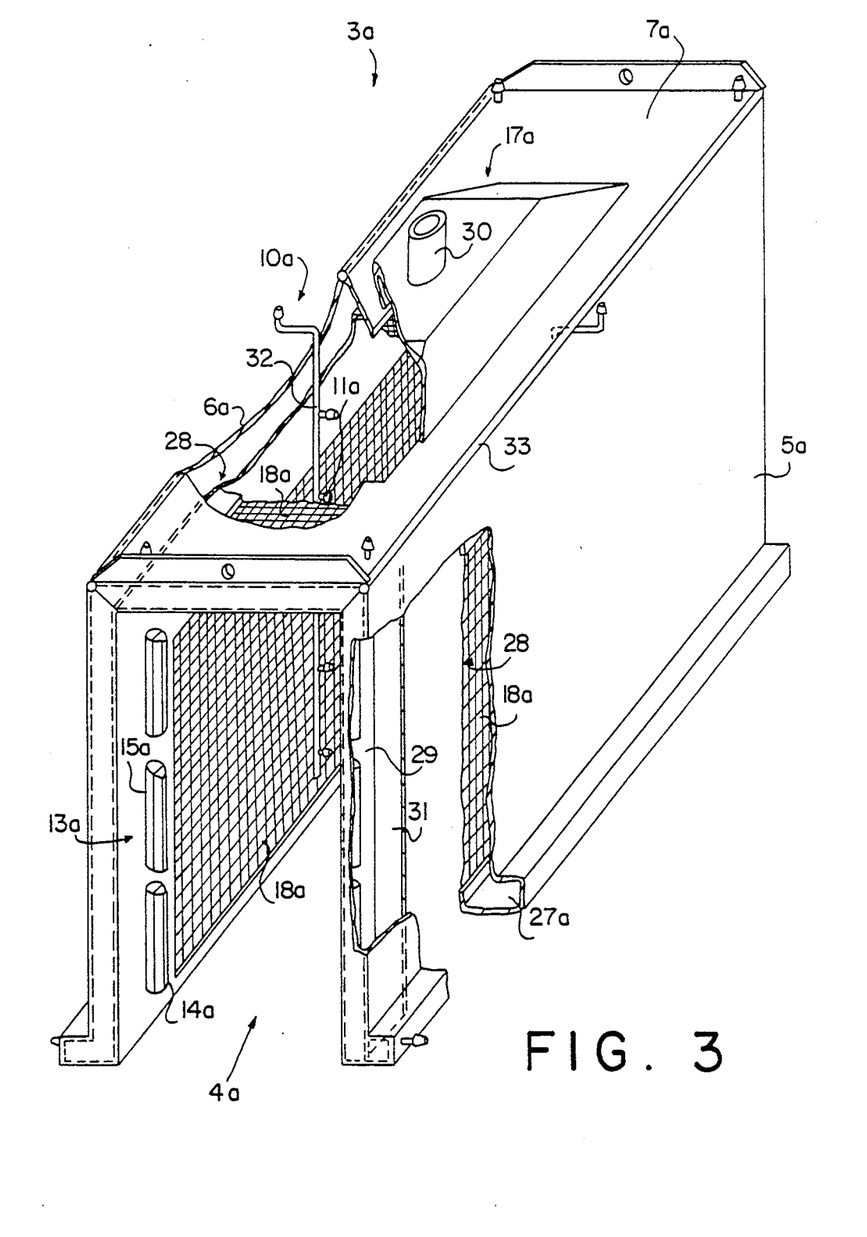
FIG. 3: a discharge unit of a discharge apparatus in perspective and part sectional representation.

In FIG. 3 corresponding parts are given the same reference numerals as in FIGS. 1 and 2 but followed by a letter a.

In the embodiment according to FIG. 3 at least one wall of passage 4a is constructed as a hollow wall and appropriately at least the side walls 5a, 6a and/or the upper wall 7a are constructed as hollow walls. These double-walled hollow walls are constructed essentially in the manner of a closed box profile and are only open to the passage 4a on the associated inner wall where a suction opening 18a or optionally an air nozzle 14a, 15a or a discharge nozzle 11a is provided. As shown in FIG. 3, suction openings 18a of the back suction device 17a can also be provided on one or both side walls 5a, 6a of passage 4a, each suction opening being completely covered by one of the said, liquid-permeable absorption means.

All walls 5a, 6a, 7a constructed as hollow walls together form several, namely e.g. three reciprocally sealed chambers 28, 29 extending over all the hollow walls. All the chambers form flow ducts having roughly the same thickness, which corresponds to the wall thickness, but different cross-sections, because they extend to a varying degree in the longitudinal direction of passage 4a. The central, largest chamber 28 extending between two lateral walls 5a,6a over the upper wall 7a is open to passage 4a via suction openings 18a and is connected to a suction hood at the top of the upper wall 7a and which is provided with a suction connection 30 for the connection of the suction line. At either end of the cabin body is provided a further, substantially smaller chamber 29, which is only located in the vicinity of the walls 5a, 6a having air nozzles 14a, 15a, or, like the chamber 28, extends over all the walls. Chamber 29 is separated from chamber 28 by one or more suitable partitions 31, which are located within the hollow wall and serve to reinforce the same. These chambers 29 which, unlike chamber 28, are also closed with respect to the collecting channel 27a are e.g. provided on the top of the cabin body with suitable connections for the compressed air feed line. The air nozzles 14a, 15a located within the inner parts of the associated walls 5a, 6a and pivotable about upright longitudinal axes are connected on the inlet side directly to chambers 29, so that they form part of the compressed air supply.

In the represented embodiment discharge nozzles 11a are arranged in superimposed manner on an upright distributing pipe, which is located directly upstream of the associated suction opening 18a and passes through the cabin body to the outside in the upper area, so that to the associated end of said distributing pipe 32 can be 
connected the treatment medium pressure line. All the connecting lines for the treatment medium, compressed air, back suction, etc. are appropriately detachable from the cabin body or the discharge unit 3a, so that simple handling is ensured during assembly, in the case of faults, for cleaning and for maintenance. For cleaning the cabin body the latter is appropriately constructed in such a way that it folds or flaps open, for which purpose e.g. the side walls 5a, 6a are connected in the upper area by means of hinge-like joints 33 to the upper wall 7a or walls 5a, 6a, 7a can be constucted so as to be detachable from one another. By partial flapping out of the side walls 5a, 6a the passage 4a is also adjustable as regards its width, although a width adjustment by displaceable mounting of the walls is also conceivable. A vertical adjustability of passage 4a can also be appropriate in order to adapt the discharge unit 3a to the different spatial conditions of the plant. It is also appropriate to have adjustability of the position of the discharge unit 3a or the cabin body with respect to the supporting frame, particularly with respect to the inclined position of discharge unit 3a.

The inventive construction makes it possible to work with the same discharge apparatus in several or at least two operating modes. If the plants e.g. as yet carry no leaves, then it is desirable for the plant stock to be treated to the wet state and it is appropriate in this case if discharge nozzles 11a discharge the spray medium substantially without any air turbulence and the passage 4a is shielded by air curtains on its otherwise unbounded sides. If the plants already have leaves, then appropriately the treatment medium is sprayed in the described manner and distributed over the plants by air turbulence.

Figure 4:
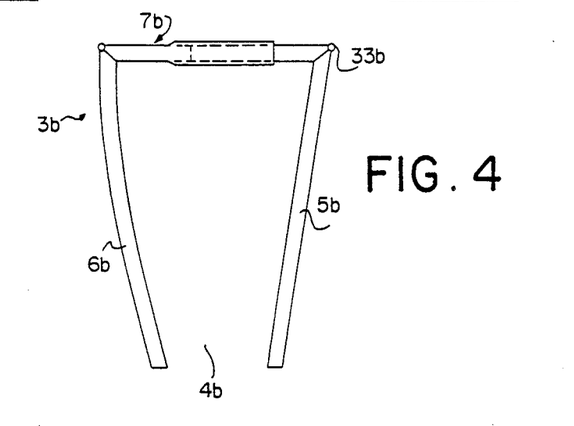
FIG. 4: another embodiment of a discharge unit viewed in the direction of travel, but without nozzle and line connections.

To adapt the passage 4b to the plant form, said passage 4b according to FIG. 4 can also be tapered from top to bottom sustantially continuously or progressively and the side walls 5b, 6b can be constructed in a planar, downwardly converging manner. However, considered in the direction of movement, one or both walls can also be slightly curved, so that they acquire a much greater dimensional stability. According to FIG. 4 the width of the upper wall 7b and therefore also passage 4b is adjustable, so that through the joints 3b also the constriction of the passage 4b can be modified or even reversed, so that passage 4b becomes wider in the downwards direction. In the particular flap position the side walls 5b, 6b are preferably continuously fixable appropriately an arresting device (not shown).

Figure 5:
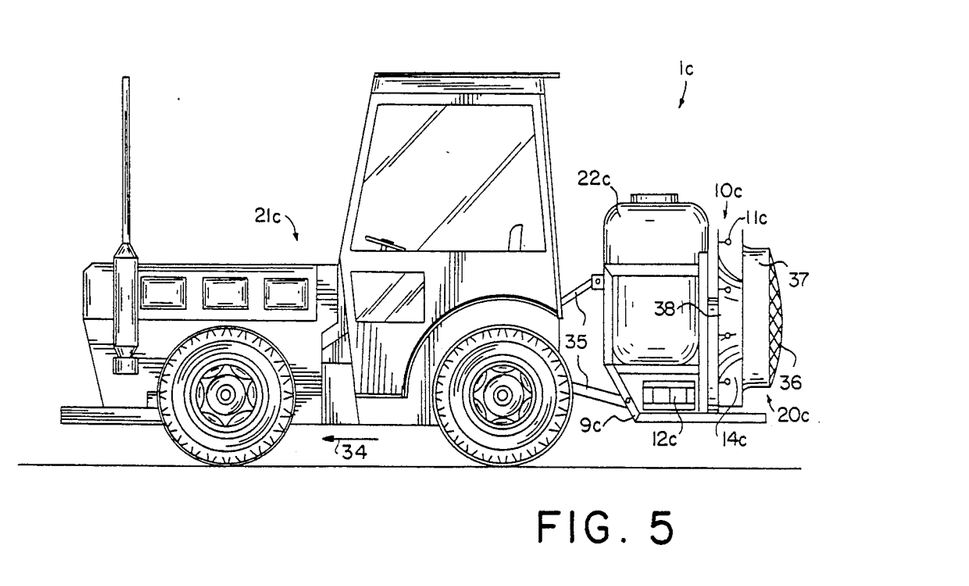
FIG. 5: a basic apparatus for re-equipping with an inventive discharge apparatus in side view.

Discharge apparatus 1c according to FIG. 5 is directly connected to the chassis of a motor vehicle 21c in a freely supported manner and namely to the three levers projecting from its rear of the three-point linkage 35, said levers being pivotably adjustable in a driven manner on motor vehicle 21c about axes parallel to the running plane. Two lower, spaced, juxtaposed levers project rearwards from a common pivot pin and the third lever is provided centrally above these two levers. By common or separate pivoting or raising and lowering of the lower and upper levers, the support frame 9c arranged thereon can be adjusted both in height and about an imaginary axis approximately parallel to the running plane and approximately at right angles to the running direction of arrow 34 in different tilting positions. The support frame 9c comprising frame bodies adjacent to the linkage 35 carries a storage container 22c and below the pressure pump 12c and behind these two parts is arranged the discharge device 10c with a blower axis roughly parallel to arrow 34. Blower 20c has a substantially cylindrical blower casing 37 relatively closely surrounding the blower (not shown) rotor and with a funnel-like deflecting member connected to its one end it bounds the circular pressure opening 14c extending substantially over the entire outer circumference and at the other, rear end forms with its open end face, optionally covered by a protective grating, the axial suction opening of the blower. In the pressure opening 14c, which directly forms the circular air nozzle of the discharge apparatus 1c, are provided circumferentially distributed, radially outwardly directed discharge nozzles 11c for the treatment medium and which are connected by means of the pressure pump 12c to the container 22c. This permits the discharge of a fan-like treatment flow roughly at right angles to the running direction of arrow 34. The treatment flow contains sprayed or atomized treatment medium.

Figure 6:
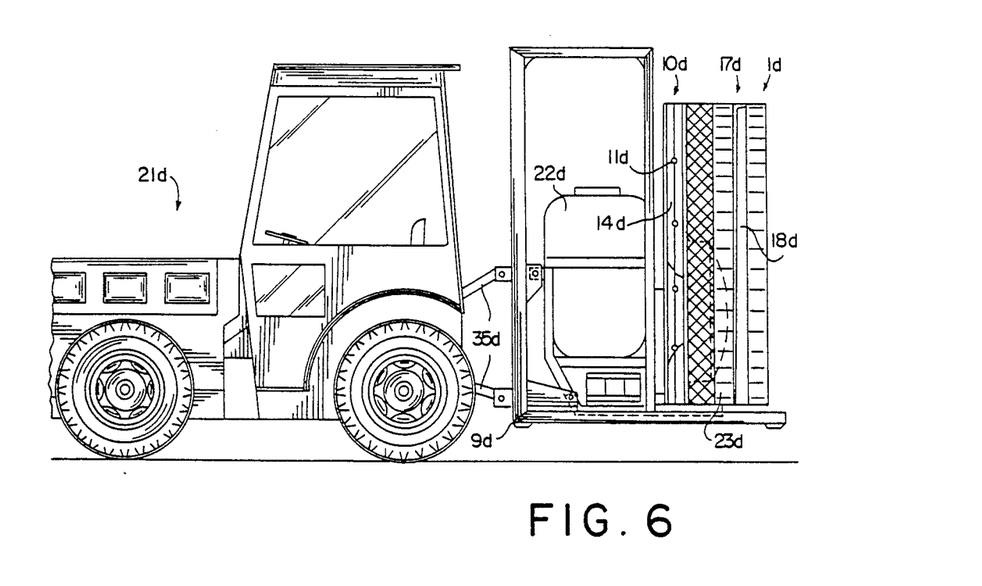
FIG. 6: another embodiment of a discharge apparatus in side view.
Figure 7:
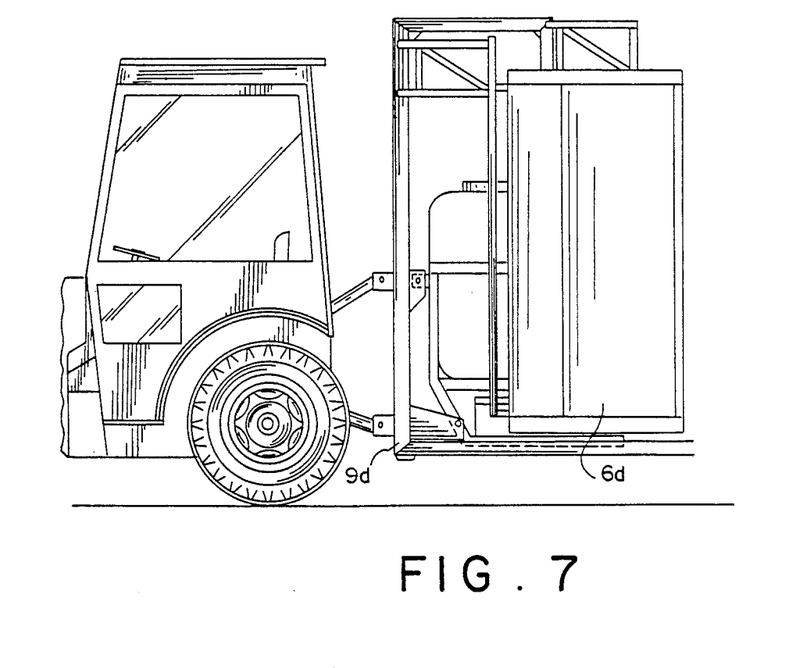
FIG. 7: the discharge apparatus according to FIG. 6 with further equipment.
Figure 8:
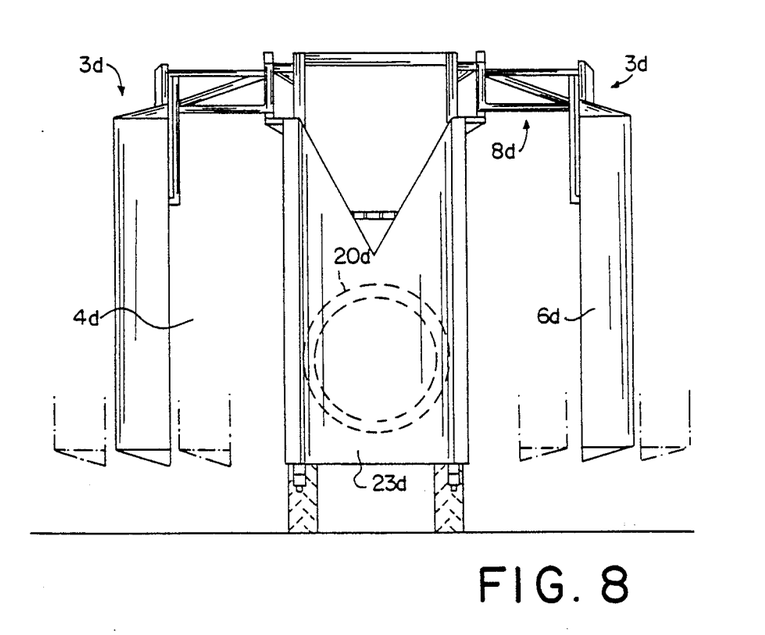
FIG. 8: the discharge apparatus according to FIG. 7 in a view from the rear.
Figure 9:
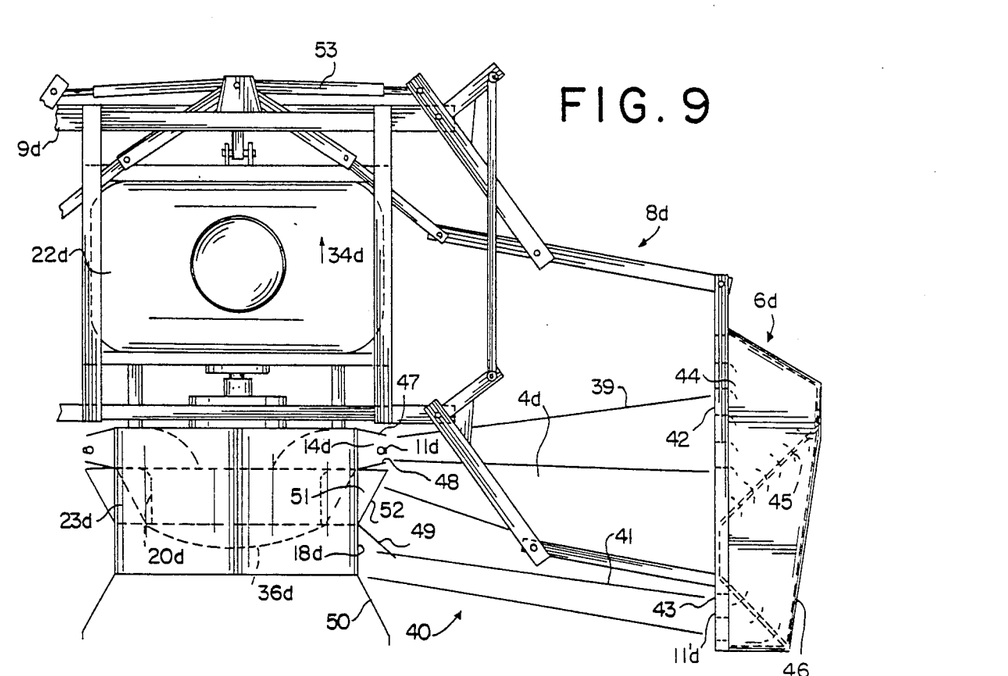
FIG. 9: a detail of the discharge apparatus according to FIG. 8 in plan view and in a first operating position.
Figure 10:
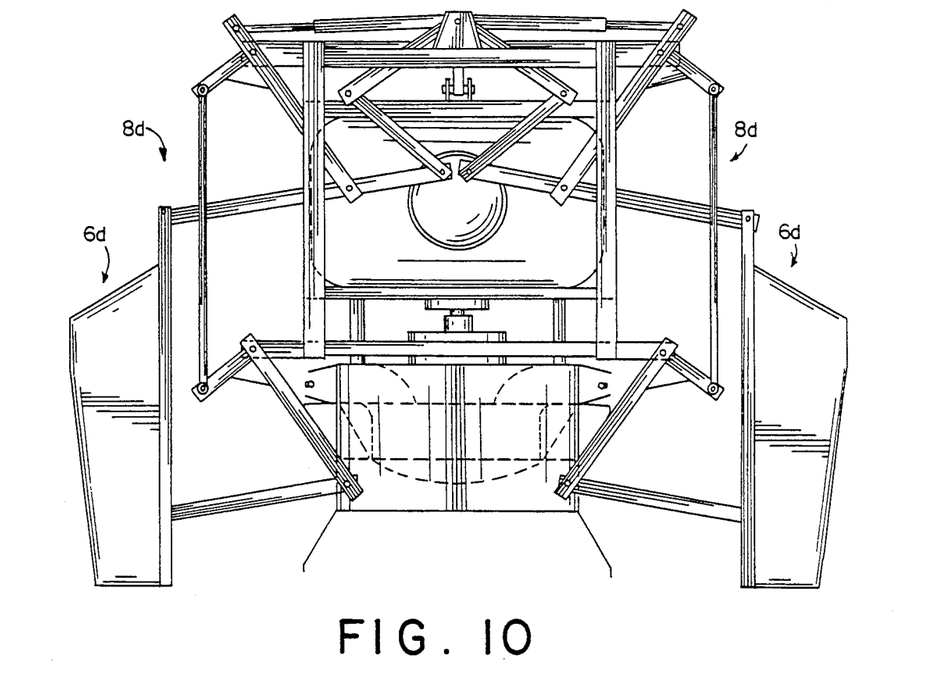
FIG. 10: the discharge apparatus according to FIG. 9 in a further operating position.
Figures 11, 12:
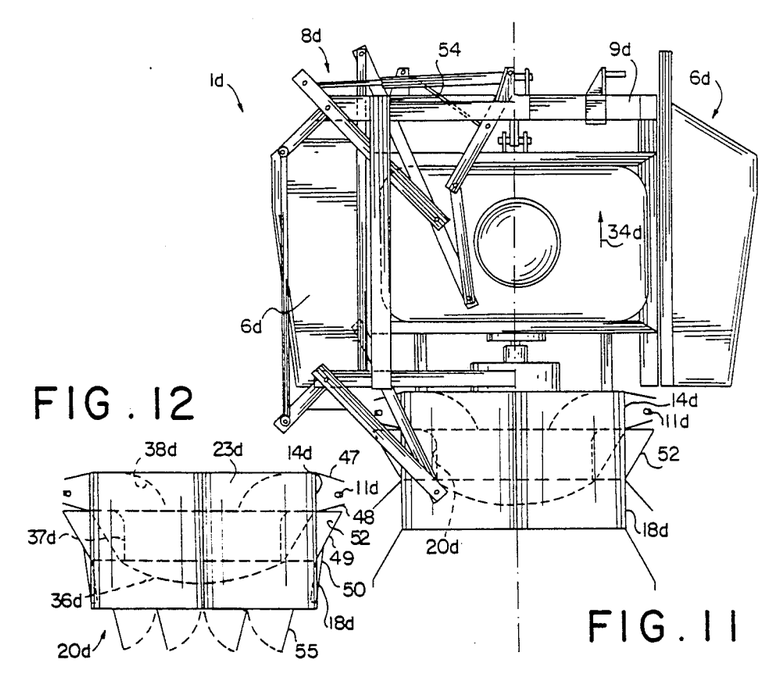
FIG. 11: the discharge apparatus according to FIG. 9 in a non-operating position of the functional parts.
FIG. 12: the blower unit of the discharge apparatus according to FIGS. 7 to 12 in plan view.
Figure 13:
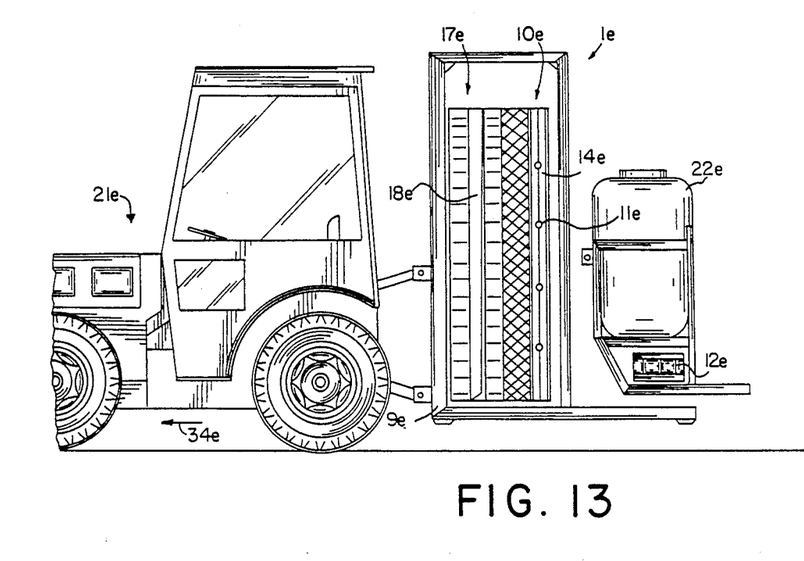
FIG. 13: another embodiment of a discharge apparatus in a representation corresponding to FIG. 6.

In the construction according to FIG. 6 the support frame 9c according to FIG. 5 is in the form of a larger support frame 9d to be arranged in easily interchangeable manner on linkage 35d and directly behind said support frame 9d the blower is surrounded by an air diverting casing 23d. The latter forms on one or both lateral, upright outsides, in each case an approximately vertical or linear elongated air nozzle 14d with discharge nozzles 11d located in the same. Air nozzle 14d is directly located in the vicinity of the blower pressure opening and is therefore directly supplied by the same. Directly behind the air nozzle 14c, the guide casing has an elongated, upright back suction opening 18d having substantially the same dimensions as air nozzle 14d and 
towards the deflection outlet 43 in wall 6. Corresponding control means 45 can also be provided in wall 6d. Each control means 44 or 45 can also form a separating device, through which most of the treatment medium droplets in the carrier air flow are separated. The treatment medium not taken up by the plants and then separated is appropriately collected and returned on a lower boundary of wall 6d and/or in a collecting channel according to FIGS. 1 and 3. The upright base wall 46 of wall 6d is so curved or bent that it also contributes to guiding the flow.

The described construction leads to a diverting device 40 for the treatment flow such that it successively flows through the treatment zone 4d into flow paths 39,41. The primary flow associated with the front flow path 39 passes from blower outlet 14d to diverting inlet 42, after which it is deflected by approximately 180° counter to the direction of arrow 34d and is led as a secondary flow to the spaced, following flow path 41 from the deflecting outlet 43 to the back suction inlet 18d. Close to or within the deflecting outlet 43 can be provided further discharge nozzles 11'd, which are oriented substantially parallel to the secondary flow and supply to the latter sprayed or atomized treatment medium again.

At least one air nozzle or the blower outlet 14d is bounded by flap-like flow directing members 47,48, a flap being arranged on each longitudinal side of the blower outlet 14d and is pivotable about an approximately vertical joint, from which the flap projects in the flow direction. The associated discharge nozzles 11d can be arranged between said flaps or directing members 47,48. In the spacing gap between the blower outlet 14d and the back suction inlet 18d can be provided a further back suction inlet 52 or a part thereof, which is inclined in the plan view to the funnel-like boundary and appropriately also has a control means 51 through whose slats treatment medium can be separated from the secondary flow. This treatment medium is appropriately collected on a lower, sloping base wall of the guide casing 23d and is returned in the described manner. In much the same way as the blower outlet 14d, the back suction inlet 18d is bounded by pivotable directing members 49 or flaps 50, the front directing member 49 being located between the two back suction inlets 18d,52.

The linkage of the particular arm 8d located upstream of blower 20d is constructed and arranged in such a way that, in plan view, it can displace the associated wall 6d between an outermost position according to FIG. 9 and an innermost position according to FIG. 10 in a substantially parallel manner, so that there is no displacement of wall 9d with respect to the inner, blower-side boundary in or counter to the running direction of arrow 34d. A drive 53 e.g. in the form of a hydraulic cylinder is provided for moving the linkage. In the outermost position of wall 6d, treatment zone 4d has the greatest width, whereas it has its smallest width in the innermost position according to FIG. 10. The linkage is constructed in such a way that it can move the wall 6d out of the position according to FIG. 10 by parallel displacement in a position according to FIG. 11 in a further inwards direction. In said non-use position, wall 6d is located immediately laterally on support frame 9d and in the direction of arrow 34d can be forwardly displaced with respect to the blower outlet 14d or the suction-back inlet 18d and therefore with respect to blower 20d, so that it is then possible to work with the discharge apparatus 1d in accordance with the construction of FIG. 6. FIG. 11 shows the discharge apparatus 1d on the right-hand side in section below arm 8d. For transferring wall 6d into the position according to FIG. 11 with each arm 8d is associated a further drive 54, e.g. in the form of a hydraulic cylinder. Both according to FIGS. 9 and 10 and according to FIG. 11, the two walls 6d can independently of one another undergo positional modifications, so that working can take place with different processes on either side of the discharge apparatus 1d. Due to the fact that it is not the inner air nozzles or boundaries of the treatment zone, but only their outer boundaries which continuously positionally varied for width adjustment purposes, a very accurate adaptation to the particular plant row is possible in such a way that the discharge apparatus can travel centrally between two adjacent plant rows. When using the wall 6d, they form both flow or deflecting and also absorption cabins for the treatment flow.

As shown in FIG. 12 the radially or tangentially located back suction inlets 18d, 52 can be closed independently of one another by suitable closing elements, which are appropriately formed by the directing members 49 or flaps 50. The flap-like directing members can be pivoted so far forward, as to close the back suction inlet 52, while flap 50 can be pivoted so far forwards that it closes the back suction inlet 18d. Flaps 47,48 can be moved so close together over at least part of their length that they substantially close the blower outlet 14d. At least one of the said flaps, particularly those of the back suction inlet are appropriately longitudinally subdivided into several and e.g. at least three interconnected individual flaps, which can be separately pivoted. Thus, portions of the in each case associated opening can be partly or completely closed, whereas other portions remain open, so that the treatment flow can be differently adjusted over its height and therefore adapted to the growth of the particular plants. The end wall of the guide casing 23d adjacent to the blower suction openings 36d can also be closed or opened to a greater or lesser extent with closing elements 55. The closing elements 55, e.g. formed by a plurality of flaps, permit a direct axial suction of blower 20d, while obviating the radial casing openings, so that the suction cross-section can be modified. Thus, much as in the construction according to FIG. 5, it is possible to axially suck in and radially blow out. During use according to the invention, the closing elements 55 are usually entirely in closed position. In FIGS. 1 to 16 the corresponding parts are given the same reference numerals, but as a function of the embodiment are provided with different reference letters, the corresponding description parts applying to all the drawings.

In the embodiment according to FIG. 13 the storage container 22e is arranged on the support frame 9e behind the blower or air nozzles 14e. The or a container can also be located on a trailer according to FIG. 1 and this also applies to pressure pump 12. The construction arrangement of the blower can be chosen in such a way that the back suction openings 18e are located upstream of the air nozzles 14e in the direction of arrow 34e, so that when using facing diverting devices the treatment flow is deflected from the primary flow path towards the secondary flow path. The outer boundaries are appropriately constructed according to FIGS. 7 to 11, the diverting inlet being located behind the associated deflecting outlet.

Figure 14:
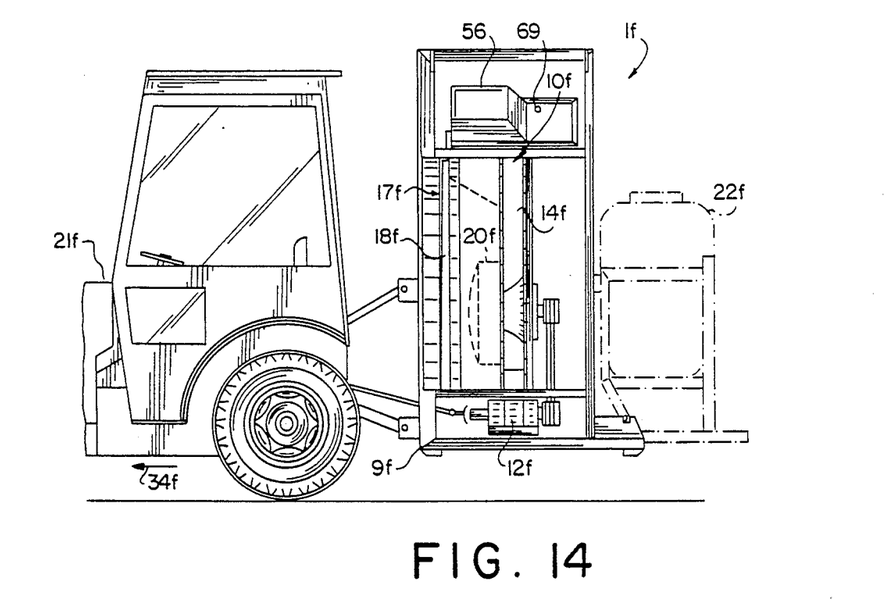
FIG. 14: another embodiment of a discharge apparatus in a view corresponding to FIGS. 6 and 13, but partly in section.
Figure 15:
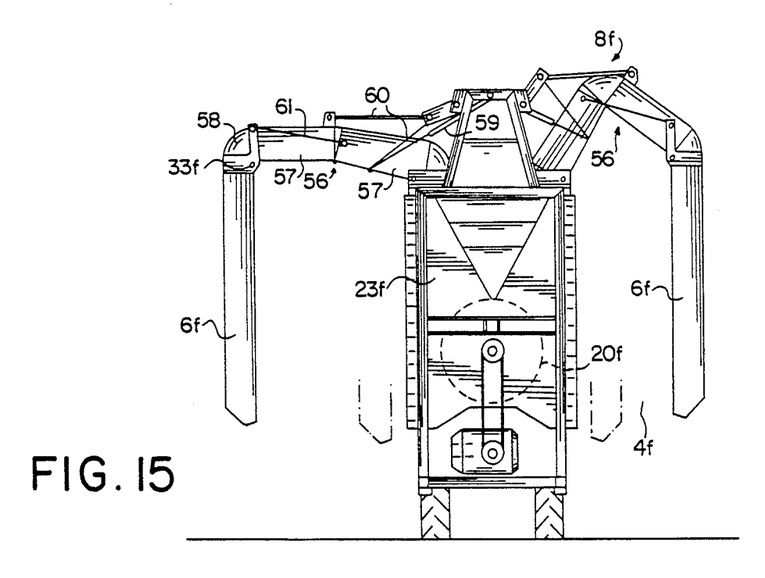
FIG. 15: the discharge apparatus according to FIG. 14 in a view of the rear.
Figure 16:
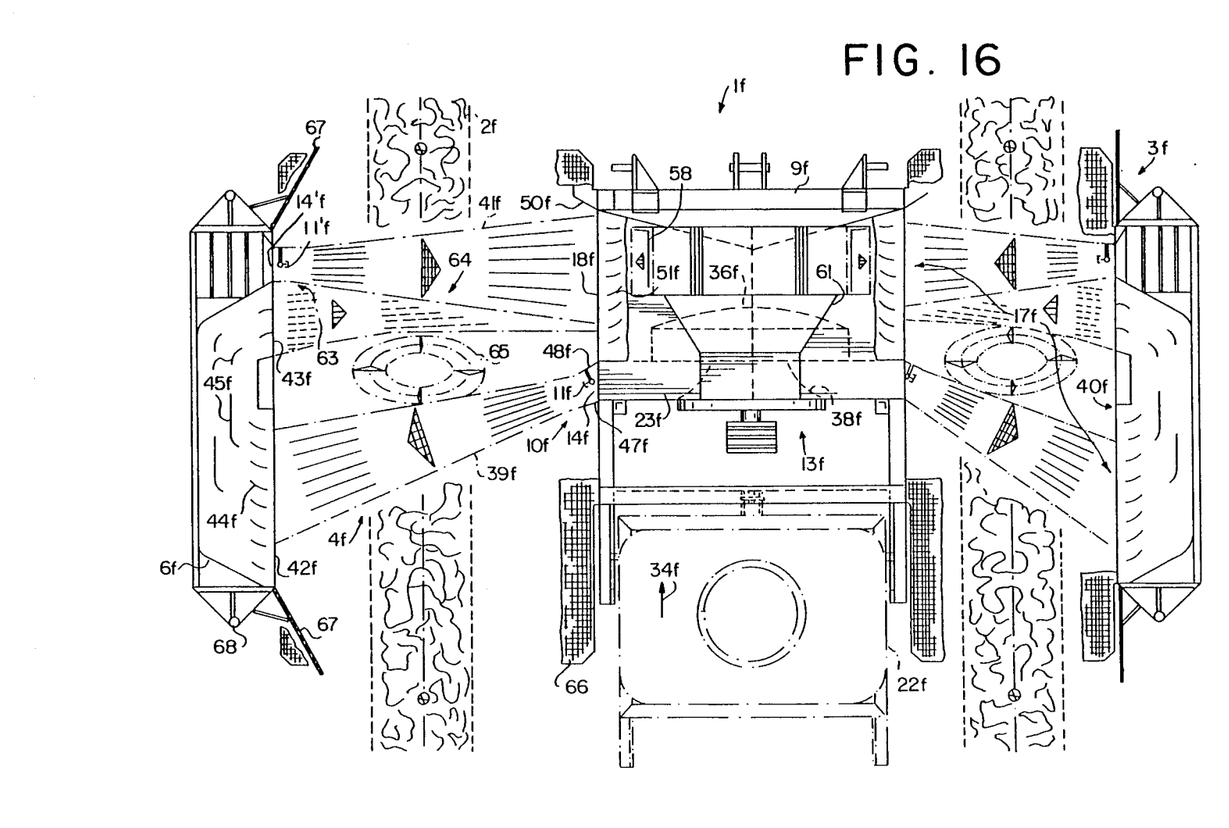
FIG. 16: the discharge apparatus according to FIG. 15 in plan view.

A similar construction with a rear discharge device 10*f* and a front back suction device 17*f* is also provided in the embodiment according to FIGS. 14 to 16. At least one arm 8*f* has in this case a duct arm 56, so that there is no need for a separate arm linkage. Each duct arm 56 comprises several and in particular two, interconnected, advantageously cross-sectionally rectangular duct portions 57, which are interconnected in articulated manner about axes approximately parallel to the running plane or direction and which are articulated on the one hand to the support frame 9*f* or guide casing 23*f* and on the other to the associated wall 6*f*. The joint axes are appropriately located in the vicinity of the undersides of the duct portions, so that each duct arm 56 can be bent in upwardly angularly projecting manner from its approximately horizontal stretched position and consequently the width of the treatment zone 4*f* can be adjusted. Moreover, each wall 6*f* is pivotably articulated about joint 33*f* to the associated duct portion 57. Between adjacent duct portions 57 and for their connection to the guide casing 23*f* and wall 6*f*, there are flexible joint portions 58, which also form duct portions, for sealing in each pivoting position. For the toggle lever-like pivoting of the particular duct arm 56, a drive in the form of e.g. a hydraulic cylinder acts on its inner duct portion 57. Both duct portions 57 are so connected to the support frame 9*f* by means of control linkage 60 that on pivoting the inner duct portion 57 the outer duct portion 57 is also pivoted by approximately an identical pivoting angle in the opposite pivoting direction.

The upper end of the wall 6*f* is fixed to a support frame member, which is pivotable about joint 33*f* with a drive 61 in the form of a hydraulic cylinder or the like, so that wall 6*f* can be adjusted both vertically and also inwardly or outwardly in an inclined manner. Drive 61 is so connected in the manner of a control linkage with the associated inner duct portion 57, that on pivoting duct portions 57 against one another wall 6*f* retains its position with respect to an imaginary reference plane at right angles thereto.

In the represented embodiment the duct arms 56 are connected on the inlet side to the pressure side or opening of blower 20*f*, the guide casing 23*f* forms a suitable guide channel 61 located substantially on its top surface. It is also conceivable to provide the duct arm for the suction connection 30 according to FIG. 3 or to connect it to the suction side of blower 20*f*. Moreover, both on the suction and pressure sides can be connected duct arms for the treatment zone. In the represented embodiment the particular wall 6*f* on the side of the deflecting outlet 43*f* remote from the diverting inlet 42*f* has a parallel blower outlet 14'*f* extending substantially over its entire length and directly adjacent thereto and which is directed substantially the same as the deflecting outlet 43*f* against the associated back suction inlet 18*f*. The width of the blower outlet 14'*f* connected to the associated duct arm 56 is smaller than that of the deflecting outlet 43*f*, whilst the back suction inlet 18*f* is much wider than the adjacent blower outlet 14*f*. The blower outlet 14'*f* in which can be located discharge nozzles 11'*f* for the treatment medium is directed in such a way that, considered in plan view it overlaps in the treatment zone 4*f* with the flow passing out of the deflecting outlet 43*f*, so that an injector-like operating accelerating device 63 for the secondary flow path 41*f* is formed. In the direction of arrow 34*f*, the two flow paths 39*f*, 41*f* are spaced from one another in such a way that a device 64 for producing a turbulence roll indicated at 65 is formed between the two flow paths 39*f*, 41*f*, said turbulence roll 65 migrating with the discharge apparatus 1*f* in the running direction along the row of plants 2*f*. Discharge nozzles 11*f* or 11'*f* are in each case arranged on a directing member 48*f* or on one of the two flaps of the associated blower outlet 14*f* or 14'*f*, so that during the pivoting thereof, they are also pivoted in the same direction and consequently their orientations are automatically adapted.

For protecting the treatment flow against drift on the top of the treatment zone 4*f*, directly on the underside of the duct arm 56 is provided a substantially closed cover wall 66 resilient in accordance with the articulated nature thereof and which in a simple manner can be formed by a flexible tarpaulin or a plate having a hinge in the vicinity of the articulation of the cantilever arm 8*f*. Corresponding shields 67 are also provided on the front, inlet-side and rear outlet-side end of the treatment zone 4*f*. On the associated wall 6*f*, each shield projects from a joint approximately at right angles to the running plane in such a way that from a position roughly parallel to the running direction it can be inclined to a greater or lesser extent in the direction of the plant row or towards the center of the treatment zone 4*f*. These shields 67 can also be formed by protective tarpaulins. Each wall 6*f* has at the front and/or rear end a protective device 68 constructed in the manner of a bumper, which absorbs the forces occurring on running onto obstacles, so that wall 6*f* is not damaged.

In order to provide even better protection against such damage, wall 6*f* is pivotably suspended in its upper area on the associated arm 8*f* about a pendulum joint indicated at 69 in FIG. 14, the approximately horizontal axis of said pendulum joint being approximately at right angles to arrow 34*f* or approximately parallel to the running plane, while being directly behind the associated duct arm 56. The associated end of said duct arm is only connected to the associated wall 6*f* by sealed insertion and any movements of wall 6*f* about pendulum joint 69 are so damped by shock absorbers or the like (not shown), that following deflection wall 6*f* automatically returns to its working position. On running up onto an obstacle, wall 6*f* can yield giving way around pendulum joint 69, which also prevents damage to plants in the case of collisions. Both through the construction according to FIGS. 1 to 3 and the constructions according to FIGS. 7 to 16, it is avoided that an excessive dynamic pressure is formed on the treatment zone boundary facing the discharge nozzles and which would deflect the treatment flow from the said zone into the open. Air curtains according to FIGS. 1 to 3 can also be provided in the constructions according to FIGS. 5 to 16. It is also possible to form a discharge apparatus by combining two or more of the described and shown discharge apparatuses. For example, a discharge apparatus according to FIG. 7 can be arranged in or at right angles to the running direction adjacent to a discharge apparatus according to FIG. 13. According to FIG. 14 pressure pump 12f and blower 20f can, via a drive shaft, be jointly driven by the power take-off shaft of the motor vehicle 21f. The drive shaft appropristely acts on the pressure pump 12f, which is in turn drive-connected via a gear, e.g. a single-stage belt drive to the blower 20f located above it. The inventive discharge apparatus is also suitable for crops close to the ground and the like.

For easier handling the container for the treatment medium may be arranged on a trailer pulled by the motor vehicle carrying the at least one discharge unit. Thereby a great volume of treatment medium may be available without stressing the motor vehicle as a direct load and without substantially affecting exact steering of the motor vehicle.

I claim:

1. A discharge apparatus for plant treating purposes, for agricultural standard row crops, comprising:
    at least one discharge unit provided to be moved in at least one advance direction over a row of plants, said discharge unit providing at least one treatment zone defining at least one boundary of a passage for the plant row to be treated with a treatment medium;
    drive means for producing at least one substantially oriented treatment stream traversing said treatment zone between at least one stream outlet and at least one stream inlet; and,
    at least one return means for receiving at least part of said treatment stream from an area of the treatment zone, and for returning said treatment stream back to an area of said treatment zone,
    wherein said return means are provided for returning at least part of at least one primary treatment stream traversing said treatment zone oriented towards said boundary by guiding at least said part as a continuing and oriented zone-traversing secondary treatment stream back into said treatment zone by subsequent free flow deflection of said treatment stream at said boundary of said treatment zone.

2. The discharge apparatus according to claim 1, wherein with at least one treatment zone are associated air nozzles for forming at least one air turbulence chamber, said return means being constructed as a return sucking device for spent air, said air nozzles being connected to a spent air inlet of the return means and being located at a distance from discharge means for the treatment medium.

3. The discharge apparatus according to claim 1, wherein at least one separator is provided for excess treatment medium, said separator being connected to said return means between at least one stream inlet of the return means and a blower means.

4. The discharge apparatus according to claim 1, wherein at least one treatment zone has front, rear and lower boundaries, at least one of said boundaries being shielded by an air curtain formed by air nozzles and passing into a turbulence zone of the treatment zone.

5. The discharge apparatus according to claim 1, wherein substantially horizontal, oppositely directed treatment streams are provided within the treatment zone, at least one freely directed traversing treatment stream being directed into a stream inlet in an oriented manner.

6. The discharge apparatus according to claim 1, wherein at least one said treatment zone is bounded laterally and on top by side walls and cover walls, at least one said stream inlet of at least one said return means being provided in the vicinity of at least one of said walls adjacent to a stream outlet and with a spacing therefrom smaller than a width extension of said stream inlet.

7. The discharge apparatus according to claim 1, wherein at least one said stream inlet of at least one said return means takes up most of at least one boundary of at least one treatment zone.

8. The discharge apparatus according to claim 1, wherein at least one said stream inlet of at least one said return means is constructed as a screen-like opening having flap-like flow directing members.

9. The discharge apparatus according to claim 1, wherein a rebound-damping absorption means for the treatment medium is provided in a discharge area of at least one discharge means for the treatment medium and in the vicinity of at least one boundary of at least on said treatment zone.

10. The discharge apparatus according to claim 1, wherein said absorption means comprises at least one cover of an associated suction opening, said cover being permeable by the treatment medium and having at least one permeable structure.

11. The discharge apparatus according to claim 1, wherein discharge nozzles of the discharge unit are provided at least at one end of at least one said treatment zone, said discharge nozzles being located in facing manner directly adjacent to at least one said stream inlet.

12. The discharge apparatus according to claim 1, wherein discharge means for the treatment medium are provided substantially in a center between facing ends of the treatment zone, said discharge means being superimposed and providing facing discharge means units.

13. The discharge apparatus according to claim 1, wherein at least one air nozzle of a number of superimposed nozzles of said discharge unit are individually arranged in directionally adjustable manner in at least one adjusting plane.

14. The discharge apparatus according to claim 1, wherein at least one wall of at least one treatment zone is substantially entirely constructed as a hollow wall, an inner area of said wall being incorporated into a duct path of at least one return means for the treatment medium and a compressed air source for air nozzles of the discharge unit.

15. The discharge apparatus according to claim 14, wherein said hollow wall is subdivided into separate chamber areas for treatment medium to be returned, compressed air and separated treatment fluid, partitions being provided for subdividing and reinforcing said hollow wall.

16. The discharge apparatus according to claim 1, wherein at least one said return means, constructed as a mist return sucking device for the treatment medium, has directed flow paths located within said return sucking device, said directed flow paths extending downstream from at least one said stream inlet.

17. The discharge apparatus according to claim 1, wherein directed flow paths extending within at least one said treatment zone are substantially upwardly directed, said return sucking device having a suction connection on a top of the treatment zone.

18. The discharge apparatus according to claim 1, wherein means are provided for guiding at least one said treatment stream in at least two successive, differently directed, substantially equally long flow paths traversing the treatment zone in substantially opposite directions, at least one deflecting duct directly connecting said successive flow paths being provided for deflecting said treatment stream over substantially maximally 180°.

19. The discharge apparatus according to claim 1, wherein means are provided for orienting at least parts of a flow of at least one said treatment stream in directed manner forwards and backwards between at least two separate, substantially facing boundaries of the treatment zone accelerating means provided by at least one air nozzle and at least one discharge nozzle for the treatment medium.

20. The discharge apparatus according to claim 1, wherein at least one blower means of the discharge unit is constructed as an axial blower having at least one radial blower outlet, at least one axial blower suction opening and a blower axis located substantially in said advance direction of the discharge unit, at least one said stream inlet being provided axially adjacent to said blower suction opening, means being associated with said stream inlet for flow guidance and for separating excess of treatment medium.

21. The discharge apparatus according to claim 1, wherein at least one guide casing is provided for mounting on at least one blower unit of said blower means, said guide casing having casing openings providing at least one lateral, radial blower outlet with discharge nozzles for treatment medium, at least one radial, lateral return suction inlet axially spaced from said blower outlet and an axial inlet on a suction-side end of the blower unit, between one and all of said casing openings being substantially independently variable between an open and a closed position by means of closing elements.

22. The discharge apparatus according to claim 1, wherein at least one boundary of at least one treatment zone is movable substantially out of a path of a treatment stream of an opposite discharge unit directed into the treatment zone, said boundary being transferable into an inoperative position displaced in the advance direction with respect to at least one blower means and close to a blower means axis thereof, said boundary facing at least one blower outlet in the operative position.

23. The discharge apparatus according to claim 1, wherein for permitting transverse movement of a boundary of said treatment zone relative to at least one blower means at least one articulated, jointed duct arm is provided leading from said at least one blower means to said boundary, providing a diverting device for a treatment stream, and said duct arm being located in the vicinity of a top of the treatment zone.

24. The discharge apparatus according to claim 1, wherein at least one cover wall is provided for at least one treatment zone, said cover wall being flexible to adapt to transverse adjusting movements of at least one lateral boundary of said treatment zone.

25. The discharge apparatus according to claim 1, wherein said inlets and outlets for a treatment stream bounding said treatment zone. are elongated in a height direction and are separately closable in segments of a longitudinal extension.

26. The discharge apparatus according to claim 1, wherein means are provided for a lateral width adjustment of the treatment zone in at least one area of its height extension, at least one boundary of the treatment zone being adjustable with a pivoting cantilever means transverse to the advance direction, said at least one boundary being pivotably mounted in an upper area at least about an axis substantially parallel to the advance direction.

27. The discharge apparatus according to claim 1, wherein at least one said blower means of said discharge unit forms part of a discharge apparatus providing a mounting unit mountable on a chassis and including at least on overall discharge unit on a support frame constructed for carrying on a towing vehicle.

28. The discharge apparatus according to claim 1, wherein a container for delivering said treatment medium is provided for mounting apart from said at least one discharge unit on a following trailer chassis.

29. A discharge apparatus for plant treating purposes, for agricultural standard row crops, comprising:
at least one discharge unit provided to be moved in at least one advance direction over a row of plants, said discharge unit providing at least one treatment zone forming a passage for the row of plants;
discharge means for a treatment medium associated with the treatment zone;
at least one blower means for producing a treatment stream; and,
at least one return means provided for returning at least part of discharged treatment medium from an area of the treatment zone, said return means being constructed for sucking connection to at least one of said at least one blower means, and wherein at least one blower outlet directed into the open of the treatment zone and at least one diverting means for deflecting at least one treatment stream into a return stream face one another transverse to at least one advance direction of the apparatus, at least one blower outlet being located adjacent to at least one return sucking inlet for said return stream, said diverting means having at least one diverting inlet associated with and spaced in the advance direction with respect to at least one blower outlet in a spacing in the advance direction, said diverting means having at least one deflecting outlet leading into the open of the treatment zone and directed counter to at least one return sucking inlet, an additional blower outlet being located directly adjacent to said deflecting outlet, said additional blower outlet leading into the open of the treatment zone for producing an accelerating air flow intersecting said return stream and directed towards the return sucking inlet.

30. The discharge apparatus according to claim 29, wherein the diverting means has at least one collecting and diverting wall constructed in the manner of an upright guide trough having at least one arrangement for guiding the stream and for separating and collecting excess treatment medium, said arrangement being located in an area between said diverting inlet and said deflecting outlet.

31. The discharge apparatus according to claim 29, wherein the accelerating air flow is at least partly located on an outside of the return stream, said outside being remote from an oppositely directed flow path.

32. A discharge apparatus for plant treating purposes, for agricultural standard row crops, comprising:
at least one discharge unit provided to be moved in at least one advance direction over a row of plants, said discharge unit providing at least one treatment zone forming a passage for the row of plants;
discharge means for a treatment medium associated with the treatment zone;
at least one blower means for producing a treatment stream; and,
at least one return means provided for returning at least part of discharged treatment medium from an area of the treatment zone, said return means being constructed for sucking connection to at least one of said at least one blower means, and wherein means are provided for producing at least one turbulence roll of treatment medium in said treatment zone between treatment streams traversing said treatment zone along oppositely directed, spaced flow paths, and being provided for bounding a turbulence zone for said turbulence roll between said flow paths.

33. A discharge apparatus for plant treating purposes, for agricultural standard row crops, comprising:
- at least one discharge unit provided to be moved in at least one advance direction over a row of plants, said discharge unit providing at least one treatment zone forming a passage for the row of plants;
- discharge means for a treatment medium associated with the treatment zone;
- at least one blower means for producing a treatment stream; and,
- at least one return means provided for returning at least part of discharged treatment medium from an area of the treatment zone, said return means being constructed for sucking connection to at least one of said at least one blower means, and wherein at least one adjustable flow directing member is associated with at least one of openings providing at least one blower outlet, at least one deflecting outlet and at least one return means inlet, treatment medium discharge nozzles being associated with at least one directing member for common adjustment.

34. A discharge apparatus for plant treating purposes, for agricultural standard row crops, comprising:
- at least one discharge unit provided to be moved in at least one advance direction over a row of plants, said discharge unit providing at least one treatment zone defining at least two opposite boundaries forming a passage for the plant row to be treated with a treatment medium;
- drive means for producing at least one substantially oriented treatment stream traversing said treatment zone between at least one stream outlet and at least one stream inlet for each treatment stream;
- at least one return means for receiving at least part of said treatment stream from an area of the treatment zone and for subsequently returning said treatment stream to an area of the treatment zone, wherein at least at one boundary of at least one said at least one treatment zone a primary stream outlet issuing into said treatment zone is directed towards a spacedly facing primary stream inlet located in the vicinity of an opposite boundary and directly connected by a deflecting duct means to a secondary stream outlet separate from and opposite to said primary stream outlet, said secondary stream outlet being directed back into said treatment zone and said deflector means connecting said primary stream inlet and said secondary stream outlet in the vicinity of said opposite boundary.

35. The discharge apparatus according to claim 34, wherein the deflector means provides a trough-like deflector, a trough-opening providing in an adjacent positioning said primary stream inlet and said secondary stream outlet located with respect to each other and connected with each other at a deflecting angle of substantially maximally 180°.

* * * * *